(12) United States Patent
Ikemoto

(10) Patent No.: US 10,377,394 B2
(45) Date of Patent: Aug. 13, 2019

(54) UNIT STORAGE DEVICE AND RAILWAY VEHICLE

(71) Applicant: Mitsubishi Electric Corporation, Chiyoda-ku, Tokyo (JP)

(72) Inventor: Minoru Ikemoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 234 days.

(21) Appl. No.: 15/325,007

(22) PCT Filed: Jul. 11, 2014

(86) PCT No.: PCT/JP2014/068554
§ 371 (c)(1),
(2) Date: Jan. 9, 2017

(87) PCT Pub. No.: WO2016/006094
PCT Pub. Date: Jan. 14, 2016

(65) Prior Publication Data
US 2017/0203774 A1    Jul. 20, 2017

(51) Int. Cl.
*B61F 99/00* (2006.01)
*B61F 1/08* (2006.01)
(Continued)

(52) U.S. Cl.
CPC .............. *B61F 99/00* (2013.01); *B61C 17/06* (2013.01); *B61F 1/08* (2013.01); *B65D 88/12* (2013.01);
(Continued)

(58) Field of Classification Search
CPC ... B61F 1/00; B61F 99/00; B61D 1/00; B61D 3/00; B61D 17/00; B60R 5/00; B60R 9/00; B60R 9/02; B60R 11/00
See application file for complete search history.

(56) References Cited

U.S. PATENT DOCUMENTS 5,216,578 A    6/1993    Zenitani et al.
6,246,585 B1   6/2001    Lee et al.
(Continued)

FOREIGN PATENT DOCUMENTS

JP    2-230800 A    9/1990
JP    4-097597 A    3/1992
(Continued)

OTHER PUBLICATIONS

International Search Report (PCT/ISA/210) dated Oct. 7, 2014, by the Japanese Patent Office as the International Searching Authority for International Application No. PCT/JP2014/068554.
(Continued)

*Primary Examiner* — Robert J McCarry, Jr.
(74) *Attorney, Agent, or Firm* — Buchanan Ingersoll & Rooney PC

(57) ABSTRACT

An enclosure (10) has an inner space in which a rectangular parallelepiped shaped device unit (6) is storable, and has a side surface with an opening (20) for insertion of the device unit (6). A mounting frame (11) is a flat plate facing the opening (20) and disposed in the enclosure (10) on the opposite side of the enclosure (10) with respect in the opening (20). A guide unit includes a slide rail (12) extending from the mounting frame to the opening, and guides the device unit (6) between the opening (20) and the mounting frame (11) in a state in which the guide unit holds the device unit (6) in the Y-axis direction.

10 Claims, 12 Drawing Sheets

(51) Int. Cl.
*B65D 88/12* (2006.01)
*B65D 90/12* (2006.01)
*B61C 17/06* (2006.01)
*B61C 3/00* (2006.01)

(52) U.S. Cl.
CPC ............... *B65D 90/12* (2013.01); *B61C 3/00* (2013.01); *Y02T 30/18* (2013.01)

(56) References Cited

U.S. PATENT DOCUMENTS

| | | | |
|---|---|---|---|
| 2007/0242423 | A1 | 10/2007 | Joist et al. |
| 2008/0061543 | A1* | 3/2008 | Gardner ............... B60R 5/041 280/769 |

FOREIGN PATENT DOCUMENTS

| | | |
|---|---|---|
| JP | 4-113693 A | 4/1992 |
| JP | 5-095090 A | 4/1993 |
| JP | 6-053676 A | 2/1994 |
| JP | 11-220275 A | 8/1999 |
| JP | 2000-236182 A | 8/2000 |
| JP | 2003-023274 A | 1/2003 |
| JP | 2006-040918 A | 2/2006 |
| JP | 2006-080221 A | 3/2006 |
| JP | 2007-131129 A | 5/2007 |
| JP | 2007-281434 A | 10/2007 |
| JP | 2009-032838 A | 2/2009 |
| JP | 2013-052715 A | 3/2013 |

OTHER PUBLICATIONS

Written Opinion (PCT/ISA/237) dated Oct. 7, 2014, by the Japanese Patent Office as the International Searching Authority for International Application No. PCT/JP2014/068554.

Office Action dated Mar. 28, 2019, by the Indian Patent Office in corresponding Indian Patent Application No. 201647044377 and English translation of the Office Action. (4 pages).

* cited by examiner

US 10,377,394 B2

UNIT STORAGE DEVICE AND RAILWAY VEHICLE

TECHNICAL FIELD

The present disclosure relates to a unit storage device and a railway car.

BACKGROUND ART

A railway car is equipped with a control device or the like for supply of power to electrical devices such as an electric motor and the like. Such a control device is stored as a device unit for example in an equipment compartment under the floor of the car (see, for example, Patent Literature 1). The device unit is inserted in the equipment compartment from the side of the railway car.

The equipment compartment disclosed in Patent Literature 1 includes, on the side surface thereof, a partition plate for holding the device unit. A heat receiving plate is located under the bottom surface of the device unit. With the heat receiving plate mounted on the partition plate, the device unit is inserted into the equipment compartment from a lateral side of the car. The heat receiving plate slides over the partition plate, and then the device unit is stored at the inner side in the equipment compartment. The device unit is then fixed in the equipment compartment by bolting.

CITATION LIST

Patent Literature

Patent Literature 1: Unexamined Japanese Patent Application Kokai Publication No. 2007-131129

SUMMARY OF INVENTION

Technical Problem

When the device unit is inserted into the equipment compartment or removed from the equipment compartment, the storage structure of the device unit disclosed in Patent Literature 1 may cause the device unit to move in a direction other than the insertion, and removal directions (loading and unloading directions), which may lead to interference with the other portion of the equipment compartment. Thus a worker needs to insert or remove the equipment unit carefully so as not to cause the interference between the device unit and the other portion of the equipment compartment.

The present disclosure has been made in view of the foregoing, and an objective of the present disclosure is to provide a unit storage device and a railway car that enable easier insertion and removal of a device unit.

Solution to Problem

To achieve the objective, the unit storage device accosting to the present disclosure includes an enclosure, a mounting frame, and a guide unit, as described hereinafter. The enclosure has an inner space in which a rectangular parallelepiped shaped device unit is storable, and has art opening for insertion of the device unit. The mounting frame is a flat plate facing the opening and disposed in the enclosure on the opposite side of the enclosure with respect to the opening. The guide unit includes a slide rail extending from the mounting frame to the opening, and guides the device unit between the opening and the mounting frame in a state in which the guide unit holds the device unit in a direction perpendicular to the longitudinal direction of the slide rail.

Advantageous Effects of Invention

According to the disclosure, the insertion and removal of the device unit with respect to the enclosure is conducted through the guide unit in a state in which the slide rail hold the device unit therebetween in the direction perpendicular to the longitudinal direction of the slide rail. The guide unit thereby inhibits movement of the device unit in a direction other than the insertion and removal directions (loading and unloading direction). This thus avoids interference between the device unit and the other portion of the unit storage device during the insertion and removal of the device unit, thereby allowing the device unit to be inserted and removed more easily.

DESCRIPTION OF EMBODIMENTS

Some embodiments of the present disclosure are hereinafter described in detail with reference to the drawings.

Embodiment 1

A unit storage device according to Embodiment 1 of the present disclosure stores a device unit such as a power conversion device, a control device, or the like for supply of power to electrical devices on-board a railway car. According to the unit storage device of Embodiment 1, a pair of slide rails, each having an L-shaped cross section, holds the device unit between the slide rails to restrict movement of the device unit in a direction other than the loading and unloading directions, thereby simplifying operation of insertion and removal of the device unit.

Figure 1:
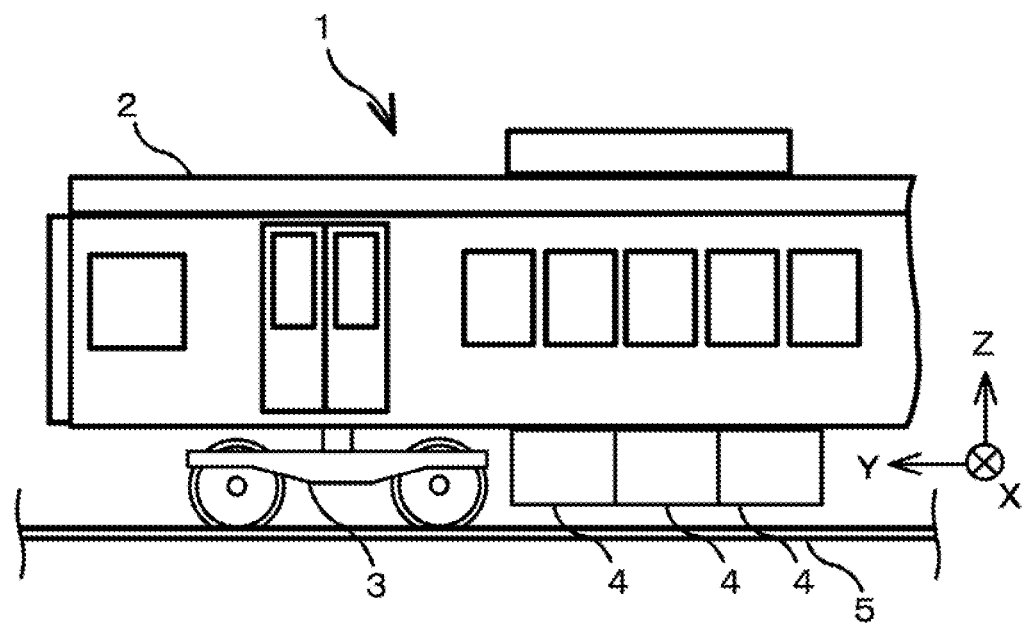
FIG. 1 is a side view of a railway car according to Embodiment 1 of the present disclosure.

As illustrated in FIG. 1, a railway car 1 according to Embodiment 1 includes a car body 2 having a passenger compartment space for accommodating passengers, a bogie 3 for supporting the car body 2, and a unit storage device 4 provided under a floor of the car body 2. The car body 2 is provided on the bogie 3. The bogie 3 is provided with wheels. The wheels run on a railway track 5 in a Y-axis direction. The bogie 3 supporting the ear body 2 leaves a space between the bottom of the car body 2 and the railway track 5. The unit storage device 4 is provided in this space.

The unit storage device 4 stores a device unit 6 therein. The device unit 6 is a rectangular parallelepiped shaped unit, which incorporates, for example, a power conversion device, a control device, and the like for supply of power to electrical devices, such as an electric motor and the like, of the railway car 1.

Figure 2:
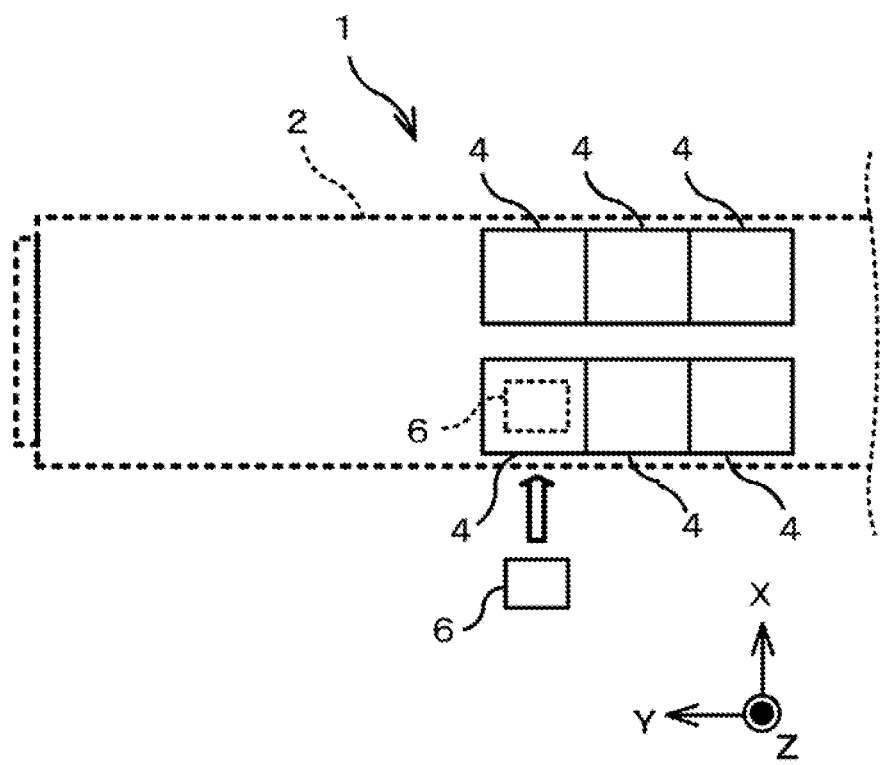
FIG. 2 is a transparent top view of the railway car of FIG. 1.

FIG. 2, which is a transparent top view of the railway car 1 of FIG. 1, illustrates unit storage devices 4, three on each of left and right sides of the car body 2 as viewed in a travel direction (+Y direction) of the railway car 1. FIG. 2 illustrates the car body 2 depicted as transparent. The device unit 6 is inserted in a lateral direction (+X and −X directions) of the car body 2 into the unit storage device 4.

Figure 3:
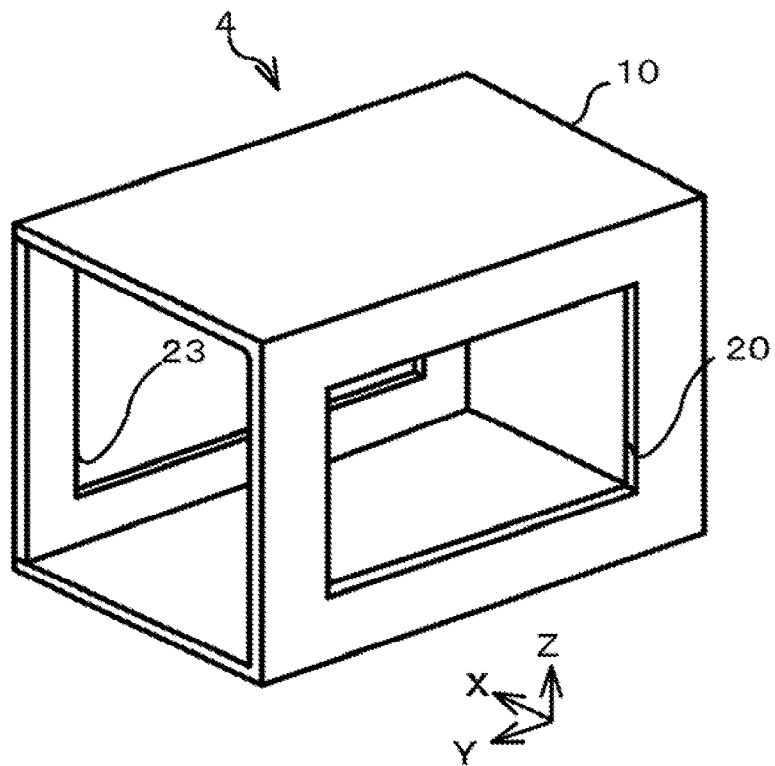
FIG. 3 is a perspective view of an enclosure included in the unit storage device.

The internal structure of the unit storage device 4 that is disposed at the −X side of the car body 2 is described hereinafter. As illustrated in FIG. 3, the unit storage device 4 includes an enclosure 10 having a storage space therein. The device unit 6 is stored in this storage space. The enclosure 10 is provided with a rectangular shaped opening 20 in the side surface thereof on the −X side of the car body 2. The opening 20 has a size large enough for the device unit 6 to be inserted and removed. The enclosure 10 is also provided with a rectangular shaped opening 23 in another side surface thereof on the +X side of the enclosure 10. The opening 23 is provided for procedures to fix the device unit 6 to a mounting frame 11.

Figure 4:
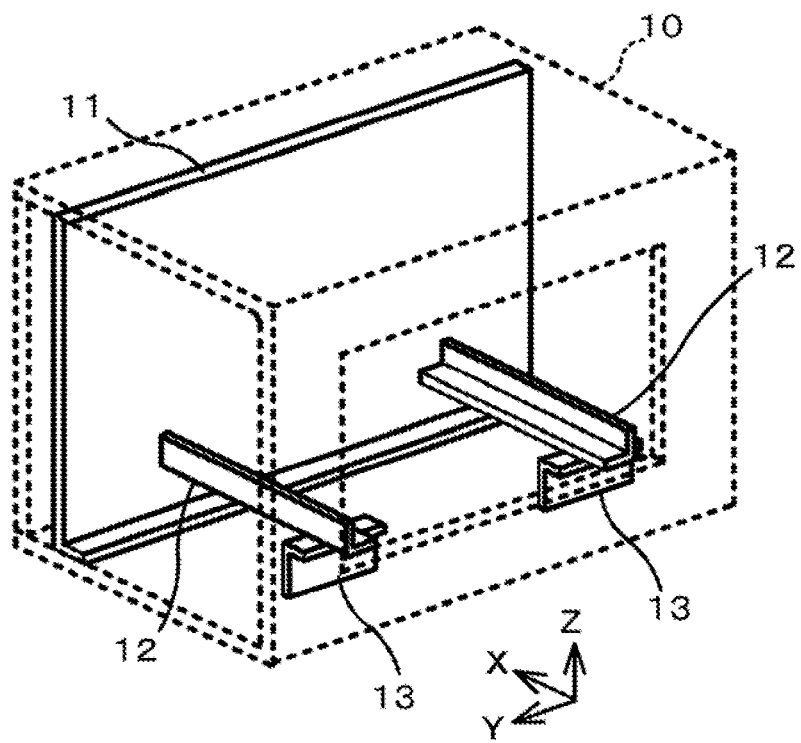
FIG. 4 is a perspective view illustrating an internal structure of the unit storage device.

FIG. 4 illustrates a structure for supporting the device unit 6 to be inserted into the enclosure 10 through the opening 20. As illustrated in FIG. 4, the enclosure 10 includes the mounting frame 11, a pair of slide rails 12, and two supports 13 therein.

Figure 5:
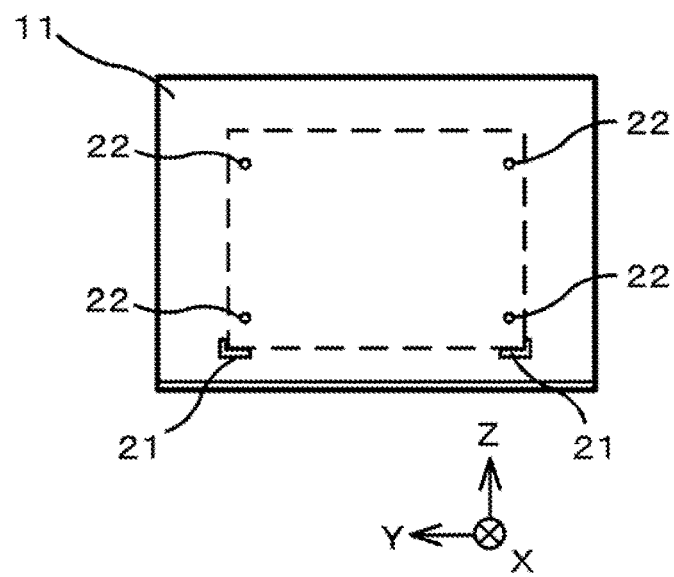
FIG. 5 is a top view of a mounting frame of the unit storage device.

The mounting frame 11 is a rectangular shaped flat plate. As illustrated in FIG. 4, the mounting frame 11 is disposed facing the opening 20 on the opposite side (+X side) of the enclosure 10 with respect to the opening 20. The mounting frame 11 is fixed to the enclosure 10, for example by screwing. As illustrated in FIG. 5, the mounting frame 11 is provided with two L-shaped insertion ports 21 at the lower side (−Z side) thereof and also with four fastener holes 22 for fastening the device unit 6. In FIG. 5, a portion surrounded by a broken line indicates an area against which the device unit 6 abuts. The insertion ports 21 are each formed to be in contact with a lower portion of the side edge and a portion of the bottom edge of the device unit 6. The four fastener holes 22 are provided in such an abutment area.

The slide rails 12 each have an L-shaped cross section perpendicular to the longitudinal direction thereof. As illustrated in FIG. 4, the slide rails 12 are disposed horizontally and parallel to each other (that is, in the X-axis direction) in the lower portion of the enclosure 10, extending from the mounting frame 11 to the opening 20. The device unit 6 needs to be located at a position higher than the lower edge of the opening 20 of the enclosure 10, which thus leads to lifting of the slide rails 12 from the bottom surface of the enclosure 10. For such lifting, the supports 13 are provided for supporting the respective slide rails 12 in the interior of the enclosure 10.

Figure 6:
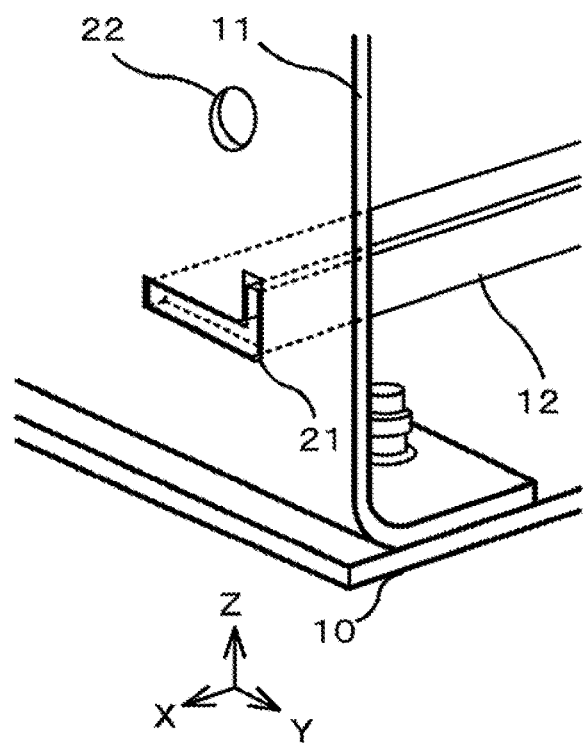
FIG. 6 is a drawing illustrating a state in which a slide rail is inserted in an insertion port in the mounting frame.

As illustrated in FIG. 6, the +X-side end portion of each slide rail 12 is inserted into the insertion port 21 of the mounting frame 11. The +X-side end portion of each slide rail 12 inserted in the insertion port 21 is thereby supported by the mounting frame 11. As described above, the insertion port 21 is formed to be in contact with a lower side of the side surface and a portion of the bottom side of the device unit 6. Thus the slide rails 12 are each positioned to be in contact with two respective side surfaces of the device unit 6, and are capable of guiding the device unit 6 between the opening 20 and the mounting frame 11 in a state in which the slide rails 12 hold the device unit 6 therebetween in the Y-axis direction (here, in a state in which the slide rails 12 support the bottom surface of the device unit 6 and hold the lower portions of the side surfaces of the device unit 6 between, the slide rails 12). As described above, in Embodiment 1, the guide unit includes the pair of slide rails 12.

With reference back to FIG. 4, the −X-side end portion of each slide rail 12 is supported by the corresponding support 13 provided in the interior of the enclosure 10. Each slide rail 12 is fastened to the corresponding support 13 by a fastening member (e.g., a rivet etc.).

The support 13 has a height identical to that of the insertion port 21 of the mounting frame 11. This thus enables horizontal installation of each slide rail 12.

Next, a method for installation of the device unit 6 is described.

Figure 7:
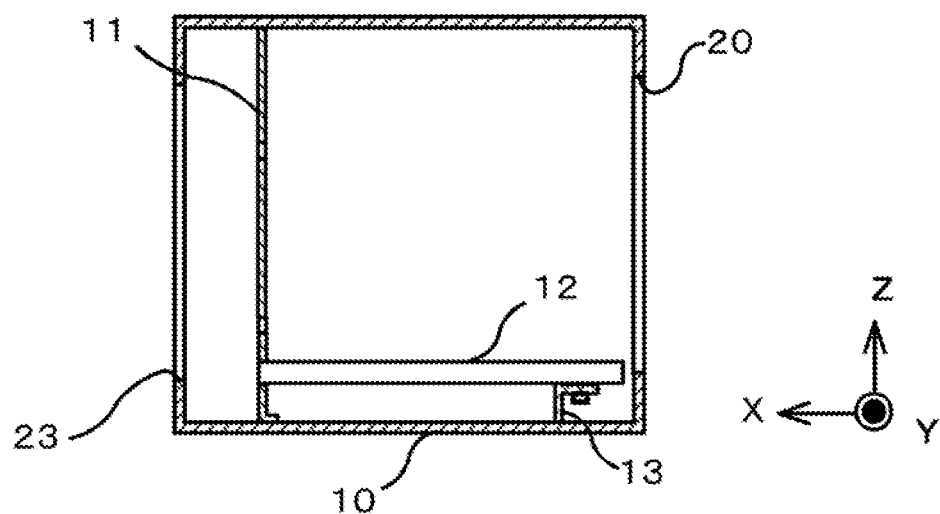
FIG. 7 is a drawing illustrating a state in which the device unit has yet to be inserted into the unit storage device.
Figure 8:
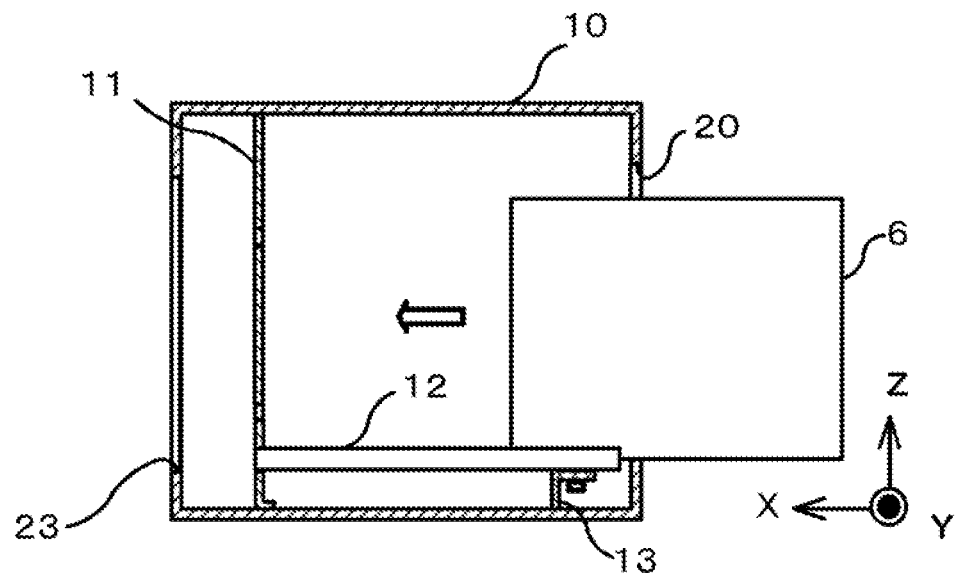
FIG. 8 is a drawing illustrating a state in which the device unit is being inserted into the unit storage device.

FIG. 7 illustrates the unit storage device 4 in a state in which the device unit 6 is not installed. As illustrated in FIG. 8, the device unit 6 is inserted from the side surface on the −X side of the car body 2 through the opening 20 into the unit storage device 4. The device unit 6 is mounted on the slide rails 12, and is then guided over the slide rails 12 up to the inner side in the enclosure 10.

Figure 9:
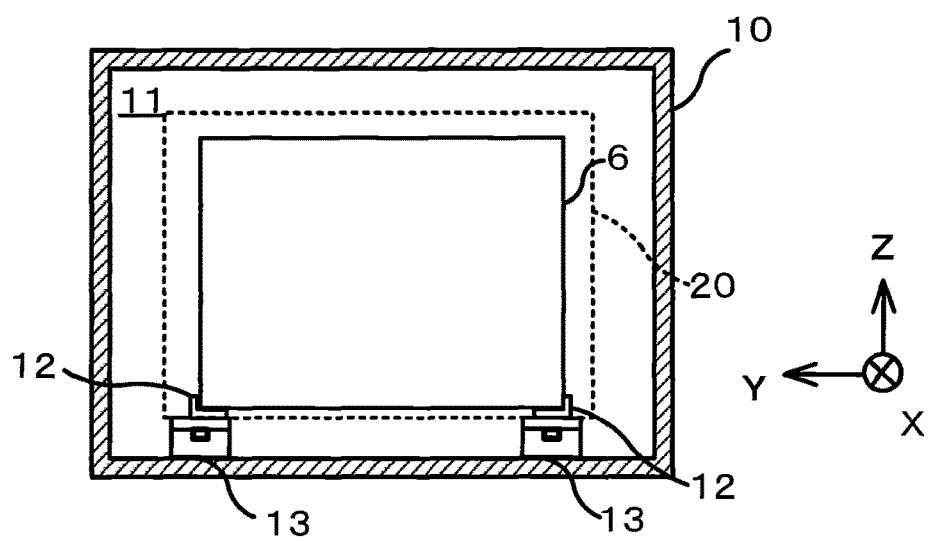
FIG. 9 is a view of the device unit stored in the unit storage device as viewed from the opening side.

While the device unit 6 is guided, the device unit 6 is supported at the bottom surface thereof by each of the pair of slide rails 12, and the lower portions of the side surfaces of the device unit 6 in the Y-axis direction are held by and between the pair of slide rails 12, as illustrated in FIG. 9. The movement of the device unit 6 is thereby limited in the Y-axis direction (the direction different front the X-axis direction that is the loading and unloading directions). This thus enables the device unit 6 to be guided up to the innermost side of the enclosure 10 on the +X side thereof without interfering with the opening 20 and other portions of the enclosure 10.

Figure 10:
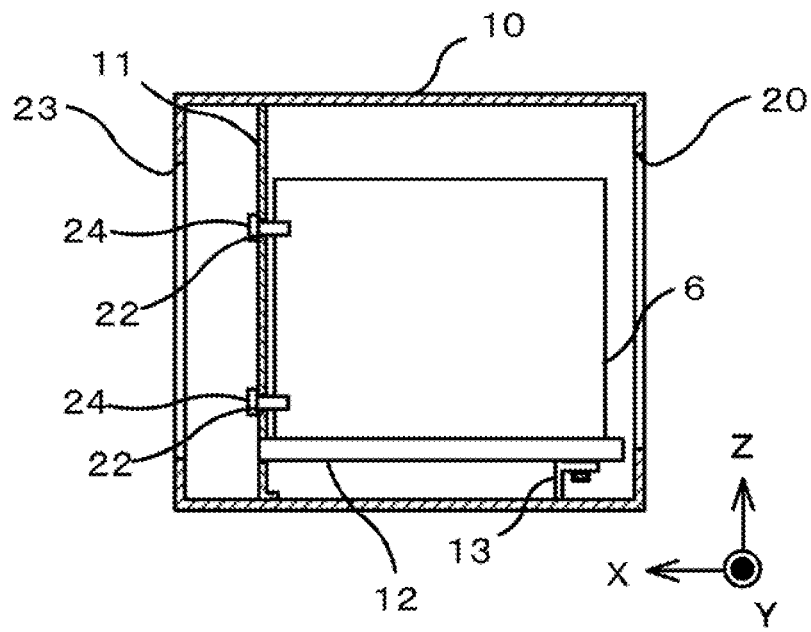
FIG. 10 is a drawing illustrating a stele in which the device unit is screwed.
Figure 11:
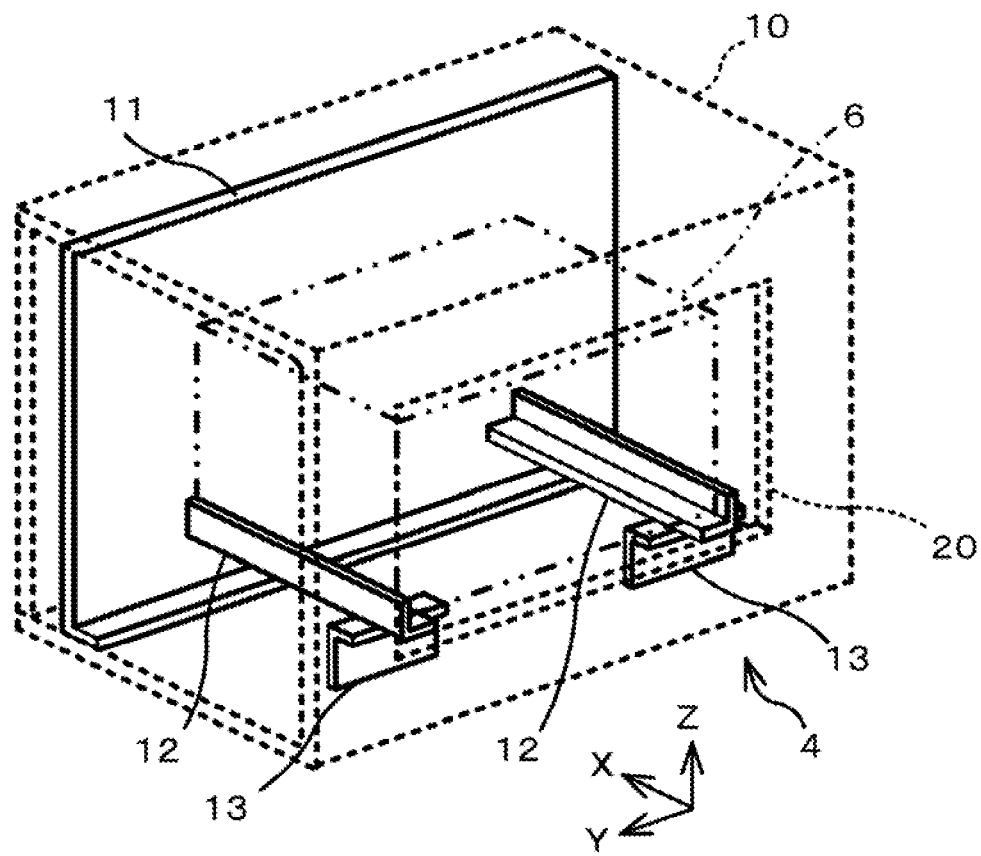
FIG. 11 is a perspective view illustrating a state in which the device unit stored in the unit storage device is fixed thereto.

The device unit 6 is fastened to the mounting frame 11 with fastening members 24 via the fastener holes 22 after being guided to the innermost side of the enclosure 10, as illustrated in FIG. 10. The device unit 6 is thus firmly fixed to the mounting frame 11, as illustrated in FIG. 11.

Figure 12:
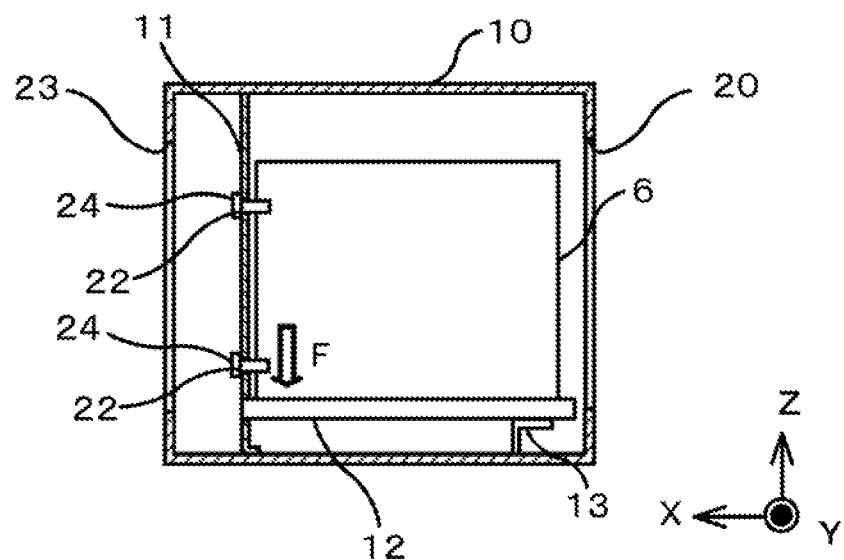
FIG. 12 is a drawing illustrating a force the slide rail receives.

With the device unit 6 fixed to the mounting frame 11, the +X-side end portions of the slide rails 12 are pressed and fixed by a force F applied by the device unit 6, as illustrated in FIG. 12. This eliminates the need to fix the +X-side end portions of the slide rails 12 to the mounting frame 11 or the like with fastening members or the like. The number of the fastening members necessary for assembly of the entire unit storage device 4 is thereby reduced. Support frames for supporting the +X-side end portions of the slide rails 12 also become unnecessary, which thus makes the unit storage device 4 lightweight.

As described above, the device unit 6 is inserted into and removed from the enclosure 10 in a state in which the pair of slide rails 12 having the L-shaped cross section holds the device unit 6 therebetween in the Y-axis direction. The pair of slide rails 12 can thereby inhibit the device unit 6 from moving in the horizontal plane in a direction other than the insertion and removal directions (loading and unloading directions). This thus avoids interference between the device unit 6 and the other portions of the unit storage device 4 during the insertion and removal of the device unit 6, thereby allowing the device unit 6 to be inserted and removed more easily.

Figure 13:
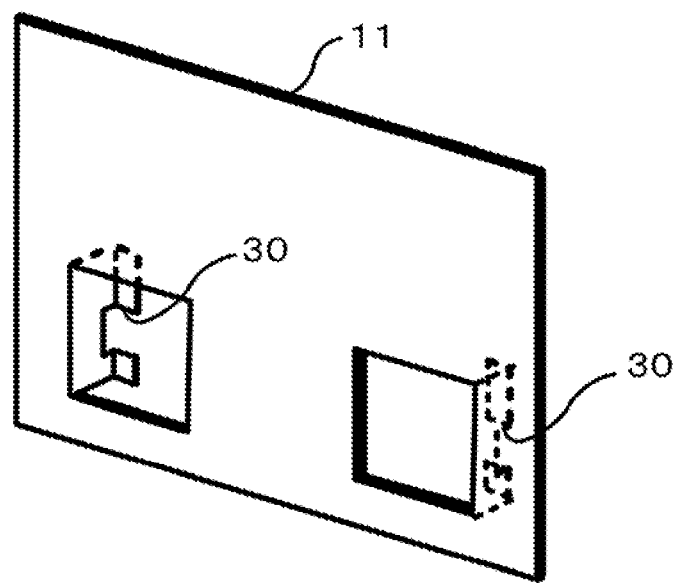
FIG. 13 is a drawing illustrating an example of cutouts provided in the mounting frame.

Using cutouts is another example method for supporting the +X-side end portion of the slide rails 12. For example, as illustrated in FIG. 13, a cutout 30 adapted to conform to the cross-sectional shape of each slide rail 12 is provided by folding a portion of the mounting frame 11 and cutting out the edge of the folded portion. Each slide rail 12 is supported to befitted in the cutout 30. However, such a cutout 30 has a more complex shape in comparison with the insertion port 21, which thus imposes a tight tolerance on the shape and the forming position of the cutout 30. Satisfying the tolerance required for installation of the slide rails 12 is difficult when using the cutouts 30 formed by metal sheet turret punch pressing and bending.

In contrast, the insertion port 21 to be provided in the mounting frame 11 is easily produced because of the simple structure thereof in comparison with the cutouts 30. Even when the insertion port 21 is made by the metal sheet turret punch pressing, the tolerance required for the installation of the slide rails 12 is ensured. For such reasons, the unit storage device 4 according to Embodiment 1 adopts the insertion ports 21, which are capable of being formed simply and precisely, rather than the cutouts 30, and improves the placement precision of the slide rails 12.

Embodiment 2

A unit storage device 4 according to Embodiment 2 includes a support having a long extension in the Y-axis direction, and the support includes a plurality of pairs of fastener holes arranged in the Y-axis direction. The unit storage device 4 according to Embodiment 2 of the present disclosure is similar to that of Embodiment 1 described above in that a pair of slide rails 12 having an L-shaped cross section holds a device unit 6 therebetween to restrict movement of the device unit 6 in a direction other than loading and unloading directions, which simplifies-operation of insertion and removal of the device unit 6. The +X-side end portion of each slide rail 12 is also inserted in an insertion port 21 of a mounting frame 11 to be supported by the mounting frame 11 in the unit storage device 4 according to Embodiment 2.

Figure 14:
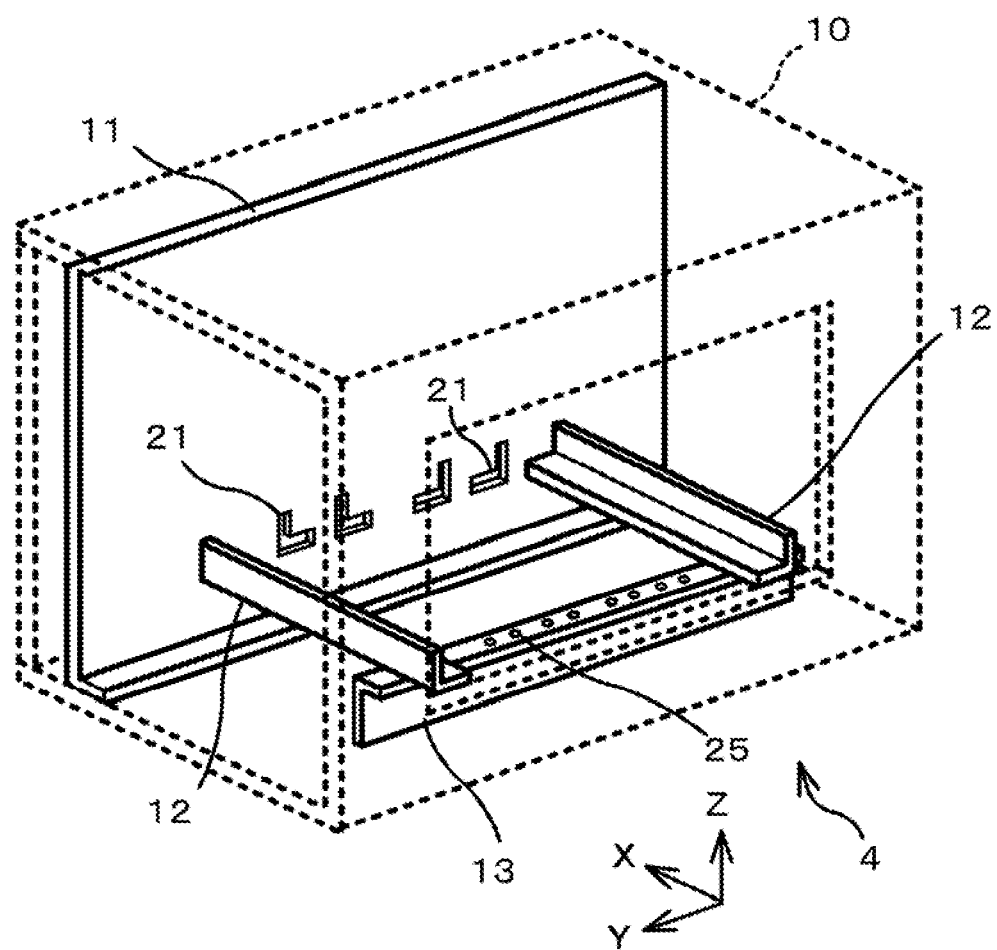
FIG. 14 is a perspective view illustrating an internal structure of a unit storage device according to Embodiment 2 of the present disclosure.

As illustrated in FIG. 14, a support 13 extends in the Y-axis direction. The length of the support 13 in the Y-axis direction is the same as the width of an opening 20 in the Y-axis direction. The support 13 includes a plurality of pairs of fastener holes arranged in the Y-axis direction and intended for fastening the slide rails 12. The mounting frame 11 includes a plurality of pairs of insertion ports 21 arranged in the Y-axis direction and intended for fastening the slide rails 12 in the Y-axis direction. The fastener holes 25 and the insertion ports 21 are formed in positions where the lower portions of the side surfaces of the device unit 6 to be stored are held by and between the pair of slide rails 12 feed through the holes and ports.

Figure 15A:
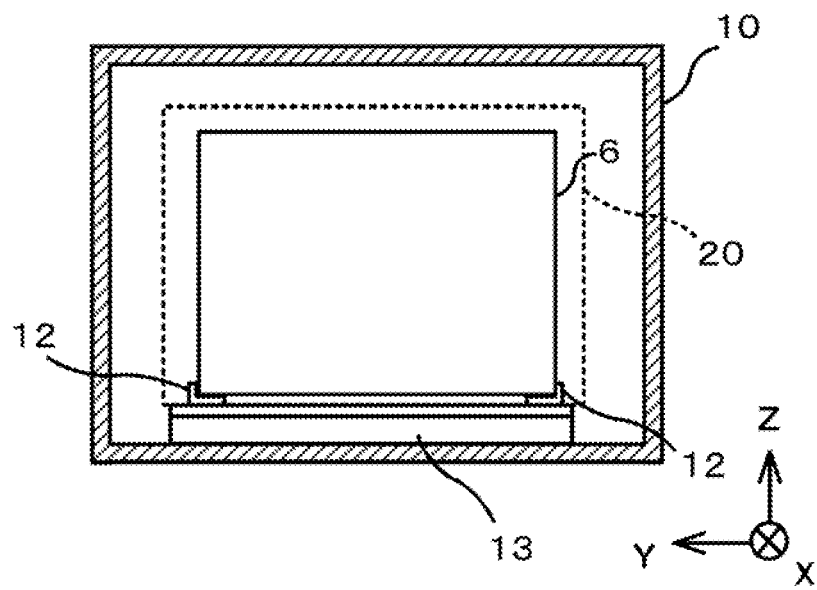
FIG. 15A is a front view of the unit storage device in which the stored device unit is laterally wide.
Figure 15B:
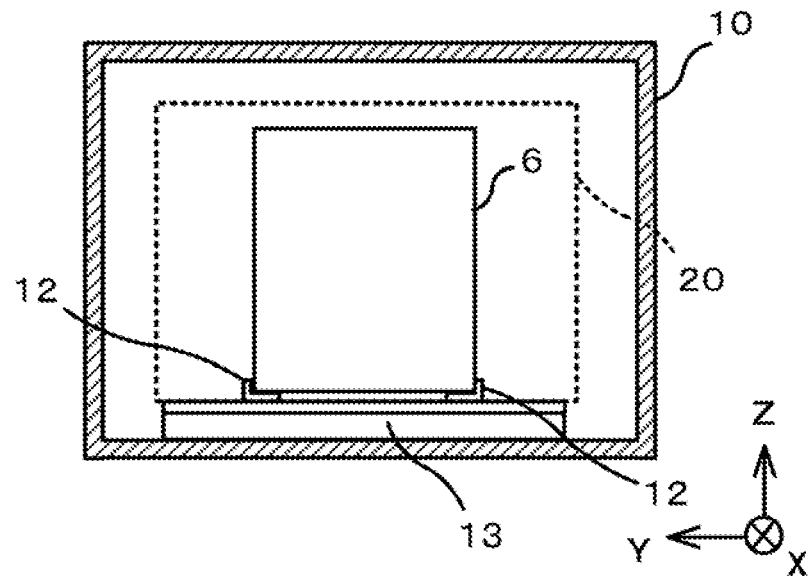
FIG. 15B is a front view of the unit storage device in which the stored device unit is laterally narrow.

The extended length of the support 13 in the Y-axis direction and the arrangement of the plurality of pairs of fastener holes 25 and insertion ports 21 in the Y-axis direction enable the slide rails 12 to be spaced apart from each other in the Y-axis direction within an area where the support 13 is installed. Thus, even when the device unit 6 has a large width as illustrated in FIG. 15A or a small width as illustrated in FIG. 15B, the adjustment of the placement position of each slide rail 12 in the Y-axis direction allows such a device unit 6 to be reliably held by and between the pair of slide rails 12 in the Y-axis direction.

As described above, according to Embodiment 2, the placement position of each slide rail 12 is adjustable in accordance with the width of the device unit 6. Thus various sized device units 6 are inserted and removed more easily.

In Embodiment 2, the unit storage device 4 includes the support 13 having a long extension in the Y-axis direction and including the plurality of pairs of fastener holes 25 arranged in the Y-axis direction, which enables the mounting position of each slide rail 12 to be adjusted in the Y-axis direction. However, this configuration, is not liming. For example, the fastener holes 25 provided on the support 13 and intended for fixing the slide rails 12 to the support 13 may be an elongated hole extending in the Y-axis direction. The mounting position of each slide rail 12 is thereby adjustable in the Y-axis direction. A plurality of pairs of supports 13 according to Embodiment 1 described above may be arranged on the bottom surface of the enclosure 10 in the Y-axis direction. In this implementation, the mounting position of each slide rail 12 is adjustable in the Y-axis direction by selection of the supports 13 on which the slide rails 12 are to be located.

Figure 16:
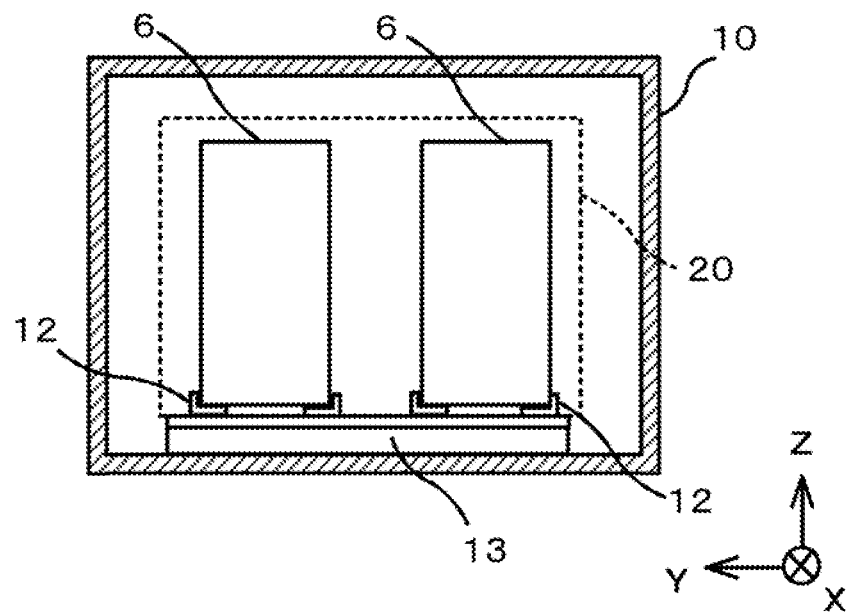
FIG. 16 is a front view of the unit storage device in which a plurality of device units are stored.

The unit storage device 4 according to Embodiment 2 also enables a plurality of device units 6 to be stored therein since the support 13 extends in the Y-axis direction. In this case, as illustrated in FIG. 16, each pair of slide rails 12 needs to be disposed on the support 13 extending in the Y-axis direction so as to hold the corresponding device unit 6 by and between each pair of slide rails 12 in the Y-axis direction.

Embodiment 3

A unit storage device 4 according to Embodiment 3 includes a support 13, which is a folded portion formed by folding a portion of the lower edge of art opening 20 of an enclosure 10 toward the opposite side of the enclosure 10. The unit storage device 4 according to Embodiment 3 of the present disclosure is similar to those of Embodiments 1 and 2 described above in that a pair of slide rails 12 having an L-shaped cross section holds a device unit 6 therebetween to restrict movement of the device unit 6 in a direction other than loading and unloading directions, which simplifies operation of insertion and removal of the device unit 6. The +X-side end portion of each slide rail 12 is also inserted in an insertion port 21 of a mounting frame 11 to be supported by the mourning frame 11 in the unit storage device 4 according to Embodiment 3.

Figure 17:
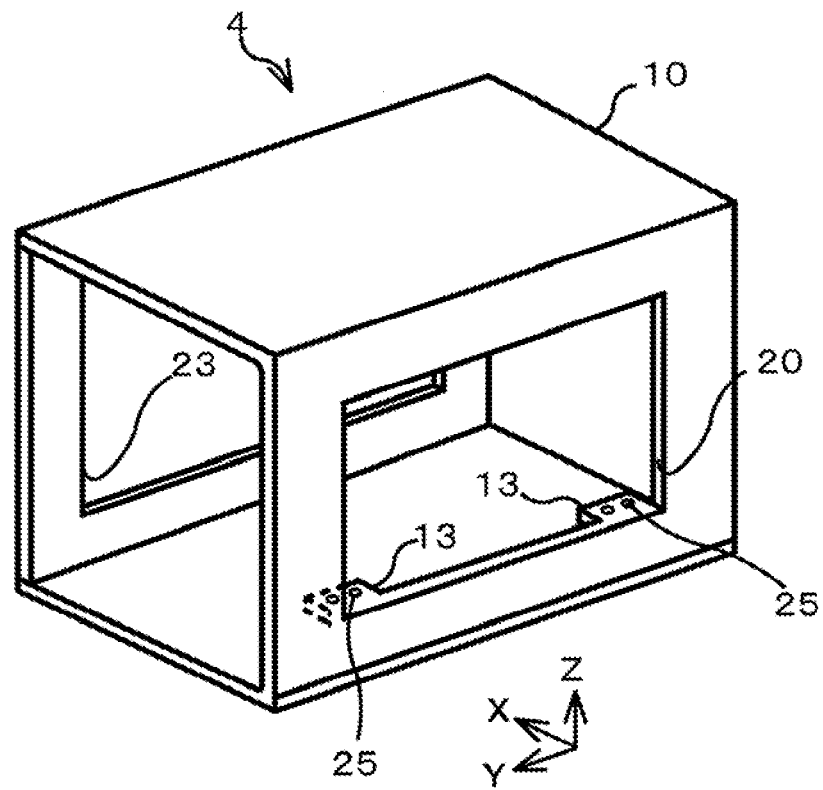
FIG. 17 is a perspective view of an enclosure of a unit storage device according to Embodiment 3 of the present disclosure.
Figure 18:
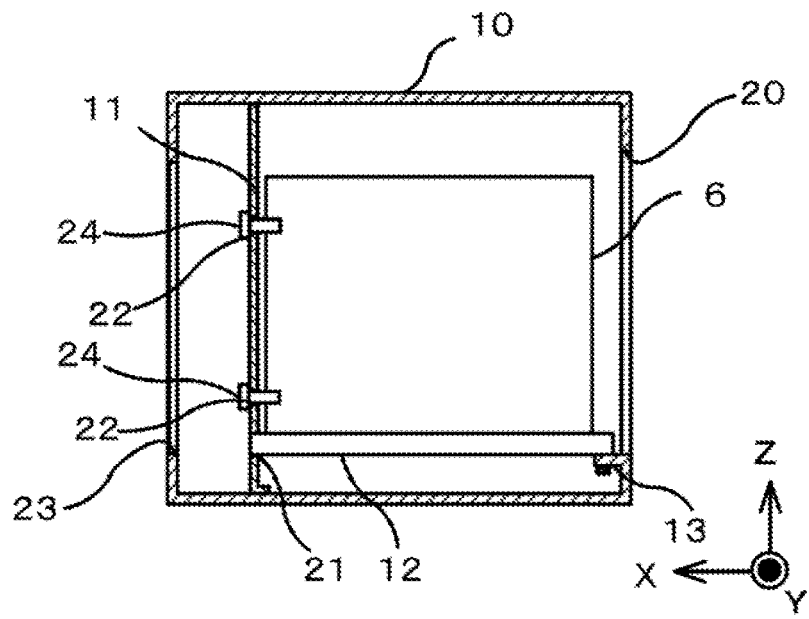
FIG. 18 is a side view of the enclosure of the unit storage device of FIG. 16.

In Embodiment 3, as illustrated in FIGS. 17 and 18, a portion of the lower edge (−Z-side edge portion) of the opening 20 of the enclosure 10 is folded toward the opposite side (+X side) of the enclosure 10 to form the folded portion. This folded portion serves as the support 13 for supporting the −X-side end portion of each slide rail 12, which end portion is not inserted in the insertion port 21.

The support 13 and the enclosure 10 are integrally formed together since the support 13 is the folded lower edge portion of the opening 20 of the enclosure 10. This eliminates fastening members or the like for fixing the support 13 to the enclosure 10, which results in reduction of the number of parts of the unit storage device 4. This also eliminates the need to dispose the support 13 according to Embodiment 1 or 2, which results in reduction in the weight of the unit storage device 4.

Limiting the size of the support 13 to the size of those portions used for support of the slide rails enables the reduction in the weight of the unit storage device 4. The same applies to Embodiment 1 described above.

Embodiment 4

A unit storage device 4 according to Embodiment 4 includes a support 13 formed by folding an entire lower edge of an opening 20 of an enclosure 10 toward the opposite side of the enclosure 10. The unit storage device 4 according to Embodiment 4 allows the Y-axis mounting positions of slide rails 12 to be adjusted in the Y-axis direction. The unit storage device 4 according to Embodiment 4 of the present disclosure is similar to those of Embodiments 1, 2, and 3 in that a pair of slide rails having an L-shaped cross section holds a device unit 6 therebetween to restrict movement of the device unit 6 in a direction other than loading and unloading directions, which simplifies operation of insertion and removal of the device unit 6. The +X-side end portion of each slide rail 12 is also inserted in an insertion port 21 of a mounting frame 11 to be supported by the mounting frame 11 in the unit storage device 4 according to Embodiment 4.

Figure 19:
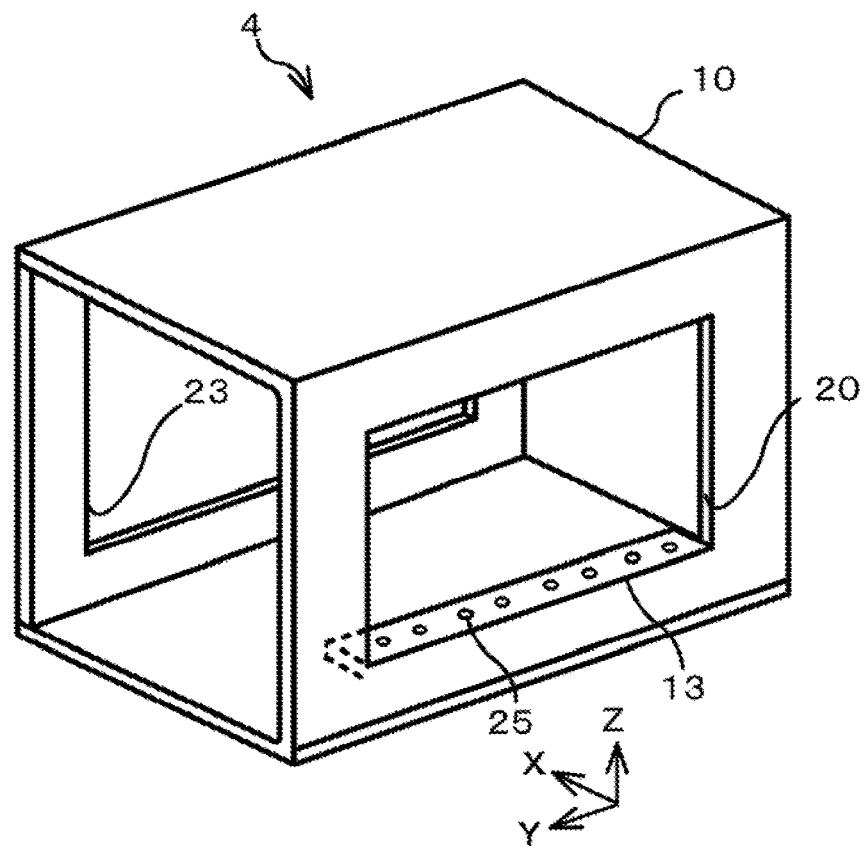
FIG. 19 is a perspective view of an enclosure of a unit storage device according to Embodiment 4 of the present disclosure.

As illustrated in FIG. 19, the entire lower edge of the opening 20 of the enclosure 10 is folded to form the support 13 for supporting the −X-side end portion of each slide rail 12. That is, the support 13 extends in the Y-axis direction in Embodiment 4. The length of the support 13 in the Y-axis direction is the same as the width of the opening 20 in the Y-axis direction. The support 13 includes a plurality of pairs of fastener holes 25 arranged in the Y-axis direction and intended for fastening the slide rails 12. The mounting frame 11 includes a plurality of pairs of insertion ports 21 arranged in the Y-axis direction and intended for fastening the slide rails 12 in the Y-axis direction (see FIG. 18). The fastener holes 25 and the insertion ports 21 are formed in positions where the device unit 6 to be stored is held in the Y-axis direction.

The extended length of the support 13 in the Y-axis direction and the arrangement of the plurality of pairs of fastener holes 25 and insertion ports 21 in the Y-axis direction enable the slide rails 12 to be spaced apart from each other within an area where the support 13 is installed. Thus, similarly to Embodiment 2 described above, even when the device unit 6 has a large width or a small width, the adjustment of the placement position, of each slide rail 12 in the Y-axis direction allows such a device unit 6 to be reliably held by and between the pair of slide rails 12 in the Y-axis direction.

As described above, according to Embodiment 4, the placement position of each slide rail 12 is adjustable in accordance wife the width of the device unit 6. Thus various sized device units 6 are inserted and removed more easily.

In each embodiment described above, the longitudinal direction of the slide rails 12, that is, the loading and unloading directions of the device unit 6, is horizontal, but is not limited thereto. The slide rails 12 may be disposed to vertically align the longitudinal direction thereof, or may be installed with an inclined alignment. For the vertical or other orientation alignment of the longitudinal direction of the slide rails 12, the slide rails 12 are disposed such that four vertical edges of the device unit 6 are surrounded by two pairs of (four) slide rails 12, or a pair of (two) slide rails is installed on a diagonal line of a cross section perpendicular to the X-axis direction of the device unit 6 such that the pair of slide rails 12 hold the device unit 6 therebetween in the diagonal direction. In this case, each slide rail 12 may be supported by insertion of one end thereof in the insertion port 21. Similarly to each embodiment described above, the support 13 for supporting the other end of each slide rail 12 may be disposed in the interior of the enclosure 10 or may be a folded edge portion of the opening 20. As in Embodiments 2 and 4 described above, the positions of the slide rails 12 may be adjustable in accordance with the size of the device unit 6.

In summary, the direction of installation for the slide rails 12 is selected as desired, provided that each slide rail 12 is configured to have an L-shaped cross section perpendicular to the longitudinal direction thereof, and is also configured to guide the device unit 6 between the opening 20 and the mounting frame 11 in a state in which each slide rail 12 make contact with two adjoining side surfaces of the device unit 6 and the device unit 6 is held by and between the slide rails 12 in a direction perpendicular to the longitudinal direction thereof.

Figure 20:
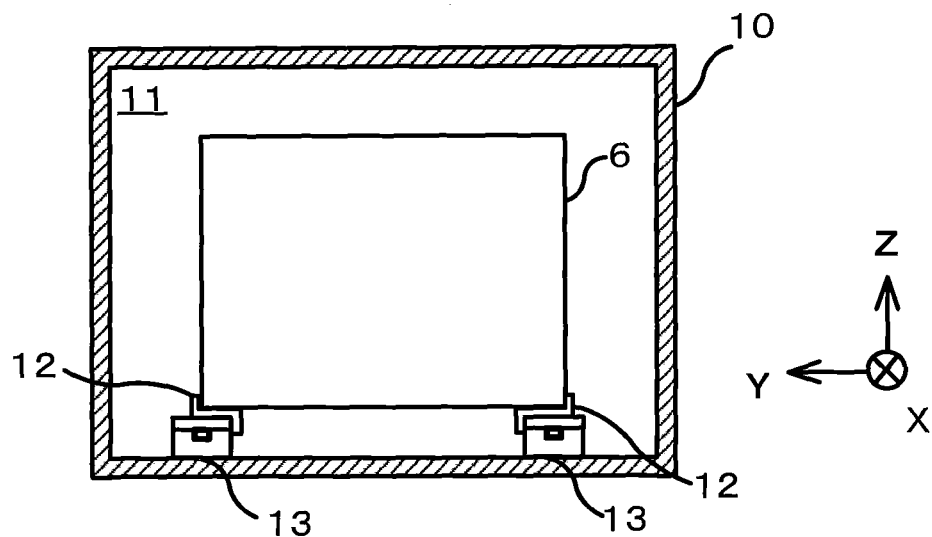
FIG. 20 is a drawing illustrating a first variation of slide rails.
Figure 21:
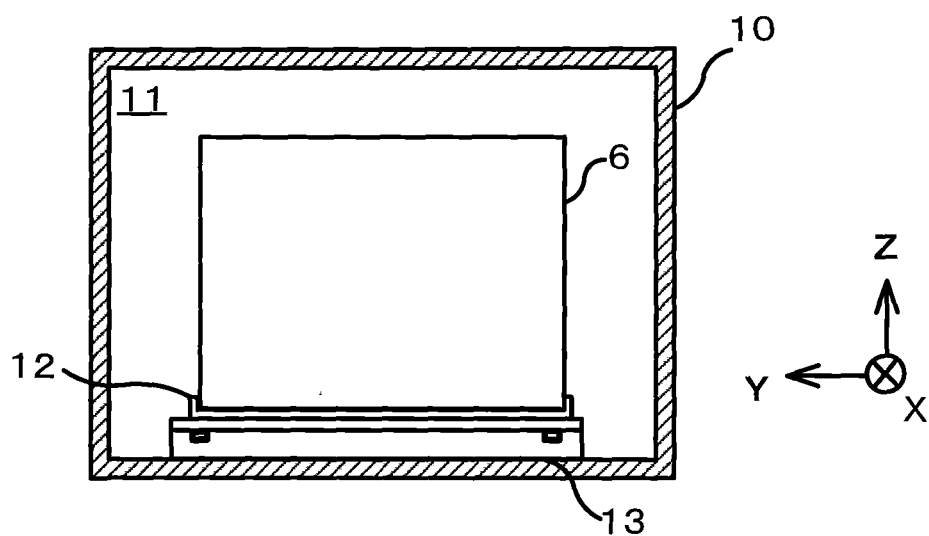
FIG. 21 is a drawing illustrating a second variation of a slide rail.

The plurality of slide rails 12 may have a non-L-shaped cross section perpendicular to the longitudinal direction (X-axis direction) thereof. For example, as illustrated in FIG. 20, the plurality of slide rails 12 may have a Z-shaped cross section perpendicular to the longitudinal direction (X-axis direction) thereof. Such a profile also allows the pair of slide rails 12 to hold the device unit 6 therebetween in the direction (Y-axis direction) perpendicular to the longitudinal direction of the slide rails 12. As illustrated in FIG. 21, a slide rail 12 may hold the device unit 6 with and between opposite end portions of the slide rail 12, the end portions of which oppose one another in the direction (Y-axis direction) perpendicular to the longitudinal direction of the slide rail 12.

In each embodiment described above, three unit storage devices 4 are provided on each of left and right sides of the car body 2, but this configuration is not limiting. Any number of unit storage devices 4 may be arranged. A single unit storage device 4 may be provided.

Although each of the above embodiments describes a type of the unit storage device 4 located under the floor of the car body 2, the present disclosure may be applied to the unit storage device 4 provided on the roof of the car body 2. In particular for the case in which the unit storage device 4 is installed on the roof, orientation of the installed slide rails 12 may be vertical or inclined.

The plurality of device units 6 provided in the enclosure 10 is described with reference to FIG. 16. Such arrangement of the plurality of device units 6 may be applied to the unit storage device 4 in Embodiment 4 described above. The unit storage device 4 according to Embodiment 1 or 3 described above enables the plurality of device units 6 to be installed with the plurality of pairs of supports 13 provided.

The unit storage device 4 may have any combination of configurations of Embodiments 1 to 4 described above. For example, the unit storage device 4 may be configured such that one end of one slide rail 12 is supported by the support 13 disposed on the bottom surface of the enclosure 10 and the other end of the other slide rail 12 is supported by the support 13 created by folding the lower edge of the opening 20.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is preferably used for a storage structure of a device unit to be installed under the floor of or on the roof of a railway car.

REFERENCE SIGNS LIST

1 Railway car
2 Car body
3 Bogie
4 Unit storage device
5 Railway track
6 Device unit
10 Enclosure
11 Mounting frame
12 Slide rail
13 Support
20 Opening
21 Insertion port
22 Fastener hole
23 Opening
24 Fastening member
25 Fastener hole
30 Cutout

The invention claimed is:

1. A unit storage device, comprising:
an enclosure having a space in which a device unit is storable and having a first wall with an insertion opening for insertion of the device unit and a second wall on a side opposite the first wall;
a mounting frame that is a flat plate facing the insertion opening and disposed in the enclosure on an opposite side of the enclosure with respect to the insertion opening and spaced from the second wall; and
a guide unit comprising a slide rail extending from the mounting frame to the insertion opening and configured to guide the device unit between the insertion opening and the mounting frame in a state in which the guide unit holds the device unit in a direction perpendicular to a longitudinal direction of the slide rail,
wherein the mounting frame is fixed to the enclosure and supports a first end portion of the slide rail.

2. The unit storage device according to claim 1, wherein the mounting frame comprises an insertion port for insertion of the first end portion of the slide rail,
the mounting frame supports the first end portion of the slide rail in a state in which the first end portion thereof is inserted in the insertion port and the slide rail is spaced from a bottom surface of the enclosure, and
the slide rail supports a bottom surface of the device unit.

3. The unit storage device according to claim 2, further comprising:
a support to support a second end portion of the slide rail, the second end portion not being inserted in the insertion port.

4. The unit storage device according to claim 3, wherein the support is a folded portion that is an edge portion of the insertion opening of the enclosure, the edge portion being folded toward the opposite side of the enclosure to form the folded portion.

5. The unit storage device according to claim 3, wherein the support allows a mounting position of the slide rail to be adjusted in the direction perpendicular to the longitudinal direction of the slide rail, and
the mounting frame comprises a plurality of the insertion ports in the direction perpendicular to the longitudinal direction of the slide rail.

6. The unit storage device according to claim 1, wherein the guide unit comprises a pair of the slide rails configured to hold the device unit therebetween in the direction perpendicular to the longitudinal direction of the pair of the slide rails.

7. The unit storage device according to claim 1, wherein the guide unit comprises the slide rail having opposite ends configured to hold the device unit therebetween in the direction perpendicular to the longitudinal direction of the slide rail.

8. A railway car comprising the unit storage device according to claim 1.

9. The unit storage device according to claim 1, wherein the device unit is rectangular parallelepiped shaped.

10. The unit storage device according to claim 1, where the enclosure includes a rear opening in the second wall.

* * * * *